United States Patent
Alsina et al.

(10) Patent No.: US 10,331,399 B2
(45) Date of Patent: Jun. 25, 2019

(54) SMART AUDIO PLAYBACK WHEN CONNECTING TO AN AUDIO OUTPUT SYSTEM

(71) Applicant: Apple Inc., Cupertino, CA (US)

(72) Inventors: Thomas Alsina, Mountain Viewa, CA (US); Andre M. Boule, San Jose, CA (US); Craig M. Federighi, Los Altos Hills, CA (US); Gregory R. Chapman, San Jose, CA (US); Deepak R. Iyer, Cupertino, CA (US); Jonathan A. Bennett, Cupertino, CA (US); Stephen O. Lemay, San Francisco, CA (US); Edward T. Schmidt, San Francisco, CA (US); Charles Magahern, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 716 days.

(21) Appl. No.: 14/918,429

(22) Filed: Oct. 20, 2015

(65) Prior Publication Data

US 2016/0357509 A1   Dec. 8, 2016

Related U.S. Application Data

(60) Provisional application No. 62/171,846, filed on Jun. 5, 2015.

(51) Int. Cl.
  *G06F 17/00* (2019.01)
  *G06F 3/16* (2006.01)
  (Continued)

(52) U.S. Cl.
  CPC .............. *G06F 3/165* (2013.01); *G06F 3/162* (2013.01); *G11B 27/105* (2013.01); *G11B 27/11* (2013.01);
  (Continued)

(58) Field of Classification Search
  CPC ......... H04M 1/72569; H04M 1/72558; H04M 1/6083; G11B 27/11; G11B 27/105;
  (Continued)

(56) References Cited

U.S. PATENT DOCUMENTS 7,983,614 B2   7/2011   Dunko
8,239,559 B2   8/2012   Rajapakse
(Continued)

FOREIGN PATENT DOCUMENTS

AU   2016203615 A1   12/2016
CN   106251889 A    12/2016
(Continued)

OTHER PUBLICATIONS

Korean Office Action, dated Sep. 29, 2017, Korean Application No. 10-2016-0066558.
(Continued)

*Primary Examiner* — Fan S Tsang
*Assistant Examiner* — David Siegel
(74) *Attorney, Agent, or Firm* — Womble Bond Dickinson (US) LLP

(57) ABSTRACT

A method performed in a portable computing device for intelligently performing audio playback, upon connecting with an audio output system. The portable computing device detects that a connection is made with an audio output system. The portable computing device determines a first audio playback application that last played audio and when the first audio playback application last played audio. If the first audio playback application played audio within a specified amount of time in the past, then the portable computing device signals that audio playback be performed from the first audio playback application (through the connection made with the audio output system.) If the first audio playback application did not play audio within the specified
(Continued)

amount of time in the past, then the portable computing device determines a second audio playback application that last played audio when the portable computing device was previously connected to the audio output system and signals audio playback from the second audio playback application (through the connection made with the audio output system.) Other embodiments are also described and claimed.

10 Claims, 4 Drawing Sheets

(51) Int. Cl.
    *G11B 27/10*     (2006.01)
    *G11B 27/11*     (2006.01)
    *H04M 1/60*     (2006.01)
    *H04M 1/725*     (2006.01)

(52) U.S. Cl.
    CPC ...... *H04M 1/6083* (2013.01); *H04M 1/72558* (2013.01); *H04M 1/72569* (2013.01)

(58) Field of Classification Search
    CPC . G06F 3/162; G06F 3/165; G06F 3/16; G06F 9/445
    See application file for complete search history.

(56) References Cited

U.S. PATENT DOCUMENTS

| | | | |
|---|---|---|---|
| 8,311,967 B1 | 11/2012 | Lin et al. | |
| 8,559,931 B2 | 10/2013 | Moon et al. | |
| 9,529,500 B1 | 12/2016 | Gauci et al. | |
| 2007/0061735 A1 | 3/2007 | Hoffberg et al. | |
| 2008/0167923 A1 | 7/2008 | Chowdhary et al. | |
| 2010/0306705 A1 | 12/2010 | Nilsson | |
| 2010/0318576 A1 | 12/2010 | Kim | |
| 2011/0035693 A1 | 2/2011 | Ueno et al. | |
| 2011/0055758 A1 | 3/2011 | Lukasiak et al. | |
| 2011/0119628 A1 | 5/2011 | Carter et al. | |
| 2012/0115453 A1* | 5/2012 | Zheng | H04M 1/72569 455/418 |
| 2012/0202424 A1 | 8/2012 | Kim | |
| 2012/0259439 A1* | 10/2012 | Li | G06F 9/445 700/94 |
| 2013/0290347 A1 | 10/2013 | Saib | |
| 2014/0032678 A1 | 1/2014 | Koukoumidis et al. | |
| 2014/0101472 A1 | 4/2014 | Rohrweck | |
| 2014/0123022 A1 | 5/2014 | Lee et al. | |
| 2014/0274185 A1 | 9/2014 | Luna et al. | |
| 2015/0082242 A1 | 3/2015 | Antipa | |
| 2015/0088422 A1 | 3/2015 | Nikovski et al. | |
| 2015/0088662 A1 | 3/2015 | Noller et al. | |
| 2016/0357509 A1 | 12/2016 | Alsina et al. | |
| 2016/0357774 A1 | 12/2016 | Gauci et al. | |
| 2017/0076208 A1* | 3/2017 | Huang | G06F 16/9535 |
| 2017/0293507 A1* | 10/2017 | Liu | G06F 1/1632 |

FOREIGN PATENT DOCUMENTS

| | | |
|---|---|---|
| EP | 2477104 A1 | 7/2012 |
| EP | 2618247 A1 | 7/2013 |
| EP | 2786889 A2 | 10/2014 |
| EP | 3107101 A1 | 12/2016 |
| JP | 2004-152276 | 5/2004 |
| JP | 2010-130669 A | 6/2010 |
| JP | 2017-003975 A | 1/2017 |
| JP | 2018-050324 A | 3/2018 |
| KR | 20120082371 A | 7/2012 |
| KR | 10-2015-0001871 | 1/2015 |
| KR | 10-2016-0143530 A | 12/2016 |
| KR | 10-2017-0142140 A | 12/2017 |
| WO | 2009/072196 A1 | 6/2009 |

OTHER PUBLICATIONS

Baladad, Mike, "How to Auto Start Your Favorite Music Player When Plugging Headphones into a Galaxy S4", Nov. 28, 2013.
Notice of Preliminary Rejection from the Korean Intellectual Property Office dated May 11, 2017 for Korean Patent Application No. 10-2016-0066558.
Examination Report from the Australia Patent Office dated May 31, 2017 for Australian Application No. 2016203615.
Hoffman, Chris, "How to Use Tasker to Automate Your Android Phone" Aug. 21, 2013. [retrieved from internet on May 31, 2017].
Second Australian Office Action, dated Nov. 1, 2017, Australian Application No. AU2016203615.
Baladad, Mike, "How to Auto-Start Your Favorite Music Player When Plugging Headphones into a Galaxy S4", Dec. 31, 2014.
Parziale, Carl, "Bluetooth connect and play-Android Apps on Google Play", Mar. 15, 2105.
Anonymous ("newdeal99"), "Auto play music on Bluetooth? | Motorola Droid RAZR", Jun. 7, 2012.
Maobipes, Comment posted on article "How to stop the Music app from auto-playing in your car", May 8, 2015.
European Application No. 16171260.9 dated Nov. 23, 2016, extended European search report.
Yan, Tingxin et al., "Fast App Launching for Mobile Devices Using Predictive User Context", MobiSys '12, Jun. 25-29, 2012, ACM 978-1-4503-13-1, Aug. 12, 2006, pp. 1-14.
PCT/US2016/033952 , "International Search Report and Written Opinion", dated Aug. 31, 2016, 30 pages.
Office Action received Japanese Patent Application No. 2016-098432, dated Oct. 12, 2017, 5 pages (2 pages of English Translation and 3 pages of original office action).
Office Action received for Australian Patent Application No. 2016203615, dated Mar. 7, 2018, 3 pages.
European Written Opinion received for EP Patent Application No. 16171260.9, dated Nov. 23, 2016, 7 pages.
Brandao, G., "Headphone Connect," Google play app, published Sep. 5, 2014, https://play.google.com/store/apps/details?id=com.brandao.headphoneconnec- t&hl=en, downloaded Jun. 8, 2015, 3 pages.
"Using Tasker, when you get in the car How to start music from Android terminal automatically", MacWin, Ver. 0.7, Jan. 29, 2011, available online at <http://usupro.blog41.fc2.com/blog-entry-352.html>, 6 pages.

* cited by examiner

SMART AUDIO PLAYBACK WHEN CONNECTING TO AN AUDIO OUTPUT SYSTEM

CROSS-REFERENCED RELATED APPLICATIONS

This application claims the benefit pursuant to 35 U.S.C. 119(e) of U.S. Provisional Application No. 62/171,846, filed Jun. 5, 2015, which application is specifically incorporated herein, in its entirety, by reference.

FIELD

An embodiment of the invention is related to intelligently deciding audio playback when a portable computing device such as a smart phone connects to an audio output system such as an automobile radio head unit. Other embodiments are also described and claimed.

BACKGROUND

Modern automotive head units can connect with a portable computing device (e.g., a smartphone) through either a wired connection (e.g., a universal serial bus, USB, cable) or through a wireless connection (e.g., a Bluetooth connection) to play audio content from an application running on the portable computing device, which is converted to sound through the vehicle's speaker system. Such playback of audio content can be halted and then resumed, by the user manually selecting a pause or stop button and then a play button. The playback can also be halted automatically when the portable computing device is disconnected from the head unit. A process running in the portable computing device monitors the "last playing audio application", by updating a data structure that identifies the application that is in foreground and currently playing audio. Examples include a music player application, a podcast application, and a music streaming application.

When the portable computing device connects to the head unit, the head unit may send a command to the portable computing device to start playing audio. In many cases, the portable computing device responds by playing audio from the application that is currently running in the foreground. Some head units will request a list of songs stored in a music library of the portable computing device and then send a command to the portable computing device to play the first song in the list (e.g., first song alphabetically). In both of these cases, the decision of which application to play audio from is determined simplistically, and more often than not, the decision does not meet the desires of the user. Other head units do not automatically request audio playback to begin, when the portable computing device connects to the head unit, but instead wait for the user to manually choose what application to play audio from, which may inconvenience the user.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention in the interest of reducing the total number of drawings, and as a result, not all elements in the figure may be required for a given embodiment.

DETAILED DESCRIPTION

Several embodiments of the invention with reference to the appended drawings are now explained. Whenever aspects of the embodiments described here are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
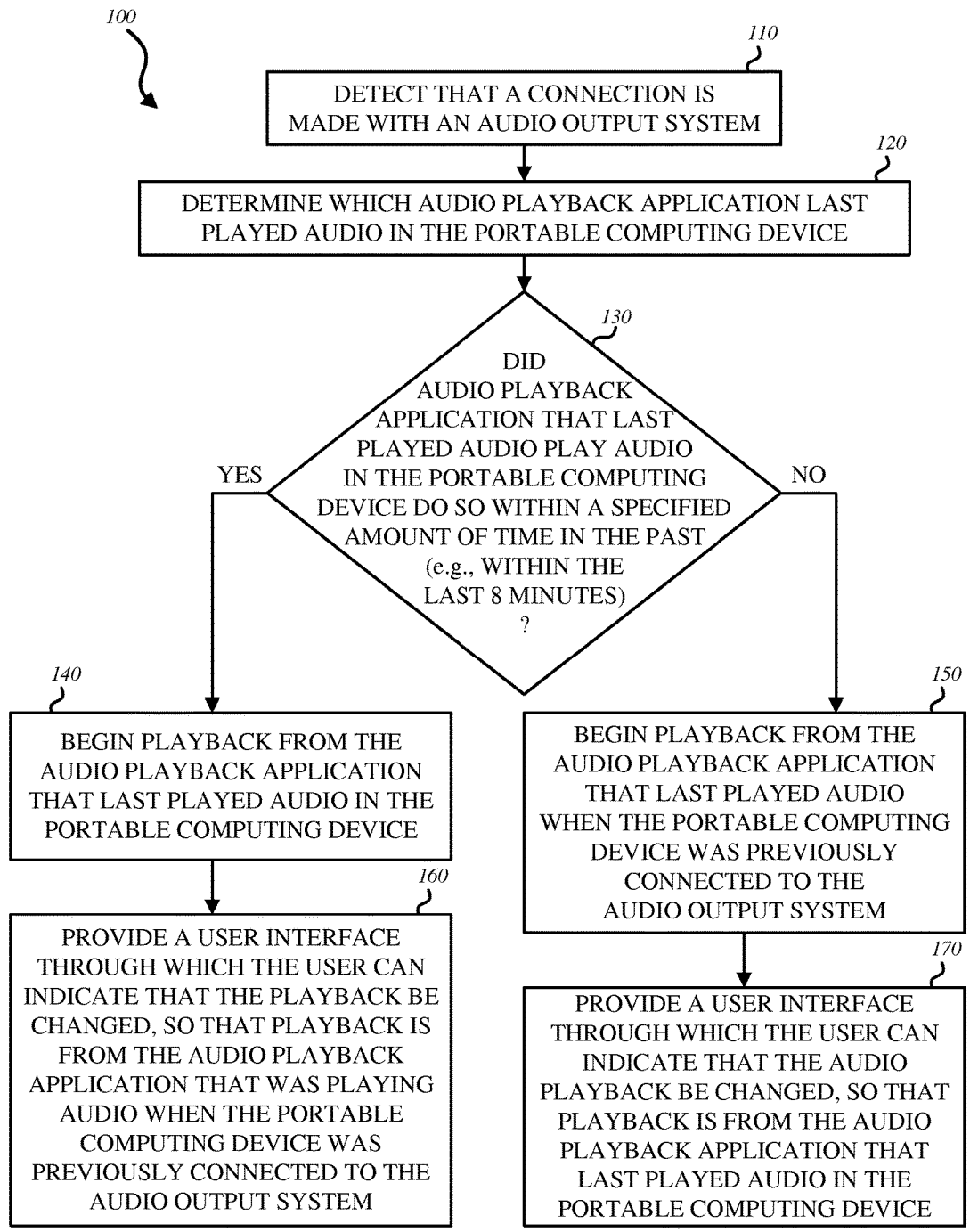
FIG. 1 is a flow diagram illustrating a process for intelligently signaling audio playback, according to some embodiments.

FIG. 1 is a flow diagram illustrating a process for intelligently signaling audio playback, according to some embodiments. The operations of the flow diagram may be performed by a portable computing device (e.g., a smartphone or a portable music player). In one embodiment, the process is initiated when the portable computing device detects that a connection is made with an audio output system (block 110). The audio output system may be a head unit of a vehicle (that is coupled to one or more speakers in the vehicle), a speaker dock, or any system that is capable of converting into sound the audio content that is being played from the portable computing device. In one embodiment, the connection between the portable computing device and the audio output system is a wired connection made over a Universal Serial Bus (USB) cable. In other embodiments, the connection is a wireless connection such as a Bluetooth connection or a Wi-Fi connection.

Upon detecting that a connection is made with the audio output system, the portable computing device determines which audio playback application last played audio in the portable computing device, (most recently played audio) (block 120). An audio playback application, as used herein, is an application that is capable of producing digital audio (e.g., from a music file, or other audio program file) and allows a user to control the production of the digital audio by halting and resuming the production of the digital audio. Examples of audio playback applications include music player applications that play music content stored locally in the portable computing device, music streaming applications that stream music received from a music provider (e.g., over a data network such as the Internet), and video playback applications. In some instances, a web browser may also be an audio playback application (e.g., when it is used to play audio or video).

In one embodiment, the portable computing device executes an audio playback controller program that manages audio playback for the portable computing device. In one embodiment, the audio playback controller keeps track of 1)

which audio playback application last played audio (through a built-in sound conversion subsystem of the portable computing device, or through an external sound conversion subsystem such as a wired/wireless connected headset, speaker dock, or vehicle head unit, just name a few examples) and 2) when it last played audio. Other programs executing on the portable computing device may access this stored information from the audio playback controller program, to determine which audio playback application last played audio.

The portable computing device determines whether the audio playback application that last played audio in the portable computing device did so within a specified amount of time in the past (block 130). This is to find out whether a user was "recently" listening to audio from the audio playback application. For example, the portable computing device could determine whether the audio playback application that last played did so within the last eight minutes. The eight minute value is provided by way of example and not limitation, and as such this time interval can be configured as desired. As introduced above, the audio playback controller may keep track of when the audio playback application that last played audio did so, for example by associating a stored time stamp with a stored identifier for the application. The time stamp could indicate the time at which the audio playback was halted for any reason. The portable computing device may access this stored information from the audio playback controller to determine whether or not the audio playback application that last played audio did so within a specified amount of time in the past.

If the audio playback application that last played audio did so within the specified amount of time in the past (e.g., within the last eight minutes), then this indicates that the user was most likely recently listening to that audio playback application. Thus, it is likely that the user would want to continue listening to that audio playback application now (upon connecting with the audio output device/system). As such, a process running in the portable computing device signals that audio playback should begin from the audio playback application that last played audio. This audio playback will be through the recently made connection with the audio output system (block 140).

Note that the application which is signaled to begin audio playback may be, at that point, already in foreground (in which case the ongoing audio playback is routed to the current connection with the audio output system), or it may be in background (in which case it will be moved to foreground to play audio out through the connection), or it may be closed (in which case it will be launched so that is can play audio through the connection.)

For example, consider a user that listens to a podcast on a headset connected to his or her smartphone while walking to his or her vehicle. As the user approaches the vehicle, the user disconnects the headset which stops the playback (and pauses the podcast), and within a few minutes after having settled inside the vehicle connects the smartphone to the head unit of the vehicle. In this case, it is likely that the user would want to continue listening to the podcast. The embodiment described here would automatically resume playback of the paused podcast (through the vehicle speaker system) when the user connects the smartphone to the head unit of the vehicle.

On the other hand, if the audio playback application that last played audio did not do so within the specified amount of time in the past (e.g., within the last eight minutes), then this indicates that the user was not recently listening to that audio playback application. Thus, it is likely that the user would want to continue listening to whichever audio playback application the user was listening to the last time the portable computing device of the user was connected to the (now connected) audio output system. That information, namely the identity of the application that was playing the last time the portable computing device was connected to the audio output system, may have been monitored by the audio playback controller program (e.g., previously stored, for access by other programs in the portable computing device). As such, a process running in the portable computing device signals that audio playback should begin from the audio playback application that last played audio when the portable computing device was previously connected to the audio output system. This audio playback will be through the recently made connection with the audio output system (block 150). For example, consider a user that listens to a podcast on a smartphone (from a podcast application on the smartphone) while driving to work (by connecting to a head unit of the vehicle). Once arrived at the office, the user disconnects the smartphone from the vehicle (which pauses the podcast) and begins working at her desk. A few hours later during lunchtime, for example, the user listens to music (from a music playback application on the smartphone that is different from the podcast application), but otherwise does not listen to any other audio playback applications on the smartphone. When the user returns to the vehicle late in the afternoon for the ride home, and connects the smartphone to the head unit of the vehicle, it is likely that the user would want to continue listening to the podcast application, and not the lunchtime music (from the music playback application.) The embodiment described here would automatically resume playback from the podcast application, when the user connects the smartphone to the head unit of the vehicle.

The decision of which audio playback application to play when a portable computing device connects to an audio output system described above is a heuristic, and thus the process may make a decision that does not match the desires of the user. As such, in another embodiment, the portable computing device may provide a user interface for the user that allows the user to choose to change the audio playback decision, to a different audio playback application than the one initially chosen by the heuristic. The user interface thus provides a "second option" that the user can choose, just in case the primary or first option chosen by the heuristic is not what the user desired. FIG. 1 is used to illustrate this "another choice" embodiment.

For example, referring to FIG. 1, if the process running in the portable computing device has decided upon the primary option being to begin the audio playback from the audio playback application that last played audio (e.g., as in block 140), then the portable computing device may provide a user interface for the user to change the audio playback decision, to the application that last played audio when the portable computing device was previously connected to the audio output system (block 160). In other words, while playback is initially and (automatically) decided as per block 140, the user is then prompted in block 160 to change the playback to a second option.

Similarly, in another example of the second option depicted in FIG. 1, if the process running in the portable computing device initially decided that audio playback should be from the audio playback application that last played audio when the portable computing device was previously connected to the audio output system (e.g., as in block 150), then the portable computing device may provide a user interface for the user to change the audio playback decision to the second option, where the second option in this case is playback from the audio playback application that last played audio (block 170).

More generally, in one embodiment, the second options mentioned above may be different than the ones given in blocks 160, 170 of FIG. 1, and may be determined by a prediction model such as the prediction model described below with reference to FIG. 2. In this way, the user interface provides the user with an option to change the audio playback decision (initially made by the heuristic) and instead begin playback from a different audio playback application than the one chosen by the heuristic.

In one embodiment, the portable computing device may provide the user interface on a display of the audio output system. For example, in one embodiment, the user interface is provided as a prompt/virtual button displayed on a display of a vehicle head unit. The user may tap the virtual button on the display (if the display is a touchscreen display) or actuate a physical button of the head unit to begin audio playback from the second option instead of the primary option. In another embodiment, the user interface is provided as a prompt/virtual button displayed on a touchscreen display that is built into the portable computing device. The user may tap the virtual button on the touchscreen display or actuate a physical button of the portable computing device to resume audio playback from the second option instead of the primary option. In one embodiment, the user interface is provided as a voice command interface. For example, a voice command application may prompt the user whether the user wants to begin audio playback from the second option instead of the primary option. The user may respond to the voice command application by speaking a command to the voice command application (e.g., "yes" or "no").

Figure 2:
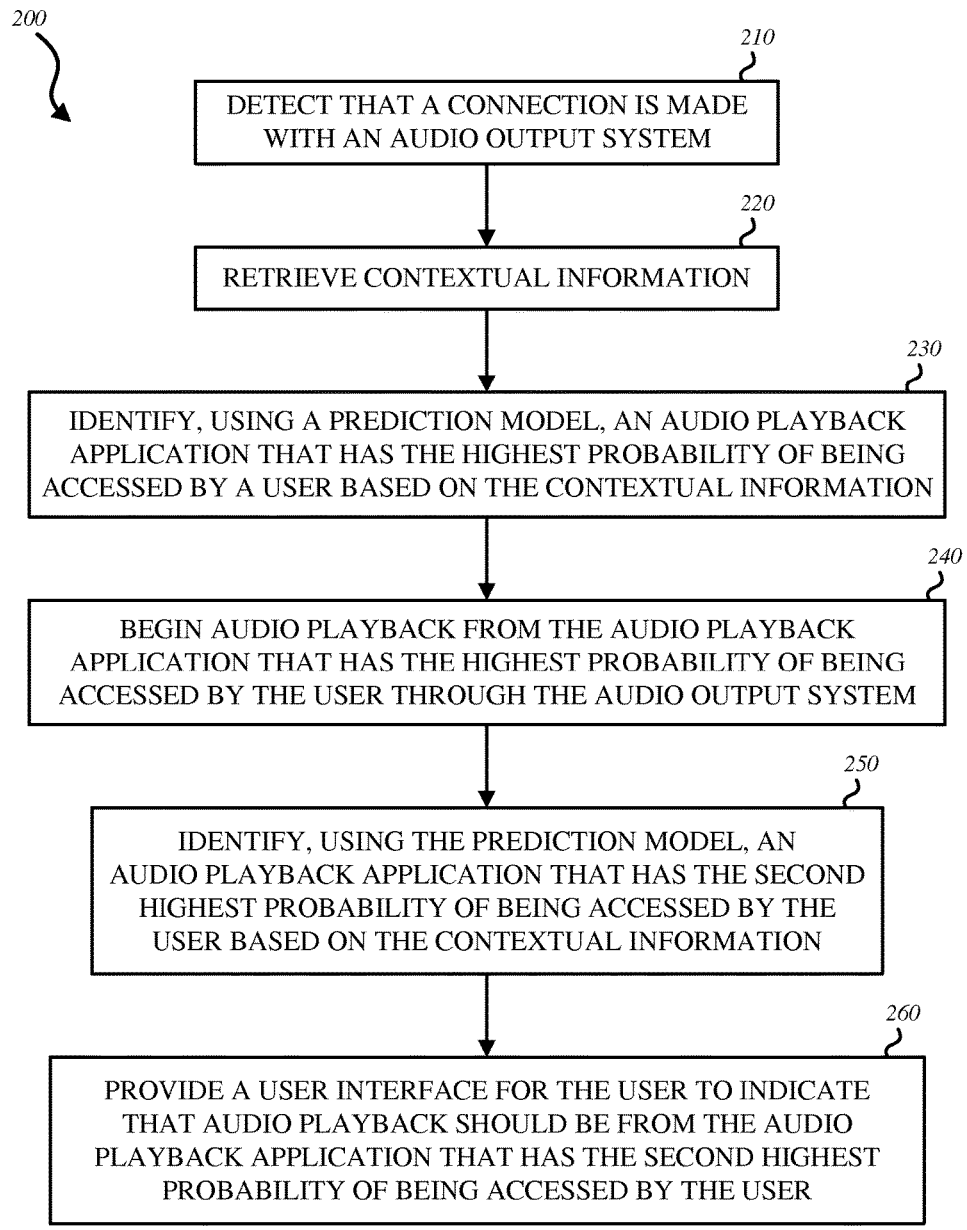
FIG. 2 is a flow diagram illustrating another process for signaling audio playback, according to some embodiments.

FIG. 2 is a flow diagram illustrating another process for intelligently beginning audio playback, according to some embodiments. The operations of the flow diagram may be performed by a portable computing device (e.g., a smartphone or a portable music player). In one embodiment, the process is initiated when the portable computing device detects that a connection is made with an audio output system (block 210). The audio output system may be a head unit of a vehicle (coupled to one or more speakers in a vehicle), a speaker dock, or any system that is capable of converting audio content being played from and received from the portable computing device. The connection between the portable computing device and the audio output system may be wired or wireless (as above, in the embodiments described in connection with FIG. 1).

Upon detecting that a connection is made, the portable computing device retrieves contextual information (block 220). In one embodiment, the contextual information may relate to the surrounding situation of the portable computing device (or its user context). For example, contextual information may relate to the time of day, the date, the day of the week, current location, and/or the current weather. In one embodiment, contextual information may also include information relating to the current audio output system that the portable computing device is connected with. The contextual information may be obtained from one or more components of the portable computing device. For example, contextual information may be obtained from any combination of hardware devices and/or software code that operate as an internal digital clock, a Global Positioning System (GPS) device, or a calendar. In one embodiment, contextual information may be obtained by accessing information over a data network (e.g., the Internet). In another embodiment, the contextual information may include the current user context, e.g., walking, running, driving, and exercising.

The portable computing device identifies, using a prediction model, an audio playback application that has the highest probability of being accessed by a user, based on the contextual information (block 230). The prediction model may learn the audio playback preferences and behavior patterns of the user, for example, by keeping a record of how often, and under what circumstances, a user plays audio from a given audio playback application. Thus, the prediction model may be based on historical interactions of the user with the portable computing device. The prediction model may utilize the contextual information, along with learned audio playback preferences and behavior patterns of the user, to predict the likelihood that a given audio playback application will be accessed by the user (upon connecting with a particular audio output system), under current circumstances. The prediction model can be based on any suitable predictive modelling technique and/or machine learning technique. Examples of such techniques are given in Appendix A titled "Application Recommendation Based on Detected Triggering Events").

For example, the predictive model may have learned from past behavior of the user that the user almost always (e.g., nine times out of ten) plays a news podcast from a podcast application on his or her morning commute to work. As such, when the user connects his or her portable computing device to the head unit of the vehicle in the morning, the predictive model may determine that the podcast application has the highest probability (amongst the audio playback applications stored in the portable computing device) of being accessed by the user.

The portable computing device begins audio playback from the audio playback application that has the highest probability of being accessed by the user. This audio playback will be through the recently made connection with the audio output system (block 240). Thus, the portable computing device intelligently makes a decision of which audio playback application to play based on contextual information and the learned preferences and/or behavior patterns of the user.

The decision of which audio playback application to play when a portable computing device connects to an audio output system described above is a prediction that may make a decision that does not match the desires of the user. As such, in one embodiment, the portable computing device may provide a user interface for the user that allows the user to choose to change the audio playback decision, to a different audio playback application than the one initially chosen by the prediction model. The user interface thus provides a "second option" that the user can choose, just in case the primary or first option chosen by the prediction model is not what the user desired.

For example, in one embodiment, the portable computing device determines the second option by identifying, using the prediction model, an audio playback application that has the second highest probability of being accessed by the user based on the contextual information (block 250). The portable computing device then provides a user interface for the user to indicate that audio playback should be from the audio playback application that has the second highest probability of being accessed by the user (block 260). In one embodiment, the second option is determined by a heuristic such as the heuristic described above with reference to FIG. 1. In this way, the user interface provides the user with an option to start audio playback from a different audio playback application than the one chosen by the heuristic. In one embodiment, the user interface may provide more than one option for the user to select from. Similar to the user interface discussed above with reference to FIG. 1, the portable computing device may provide the user interface on a display of the audio output system (e.g., display of a vehicle head unit) or a touchscreen display that is built into the portable computing device. Also, the user interface may be provided as a voice command interface.

Any combination of the heuristic and the predictive model can be used to intelligently and automatically (e.g., without needing a play command from the user) start audio playback when a portable computing device connects to an audio output system. For example, if the predictive model identifies an audio playback application that has a high probability of being accessed by the user (e.g., greater than 90 percent), the portable computing device may decide to start audio playback from this audio playback application and not rely on the heuristic. If the predictive model is not able to identify an audio playback application that has a high enough probability of being accessed by the user, the portable computing device may decide to rely on the heuristic to decide which audio playback application to invoke. In one embodiment, the portable computing device may override a command, received from the connected audio output system, that is requesting to play audio from a particular audio playback application, and instead play audio from an audio playback application that was chosen based on a heuristic or a predictive model, as described above. These processes, running in the portable computing device, may provide more intelligent decisions than the audio output system, since they can take into account the context of the portable computing device, e.g., its user context.

In one embodiment, the portable computing device may also determine the content to be played by the user via the audio output system. Once the audio playback application is determined (e.g., blocks 140, 150, 230), the operating system of the portable computing device may determine the recommended content to be played during playback (e.g., blocks 140, 150 and 240). The operating system may also generate a playback queue of recommended content for the audio playback application that was determined (e.g., blocks 140, 150, 230). The operating system may also generate the playback queue of recommended content for the audio playback application that is presented as an alternative to the user (e.g., blocks 160, 170, 260). For example, at blocks 160, 170, 260, when the user is presented with a user interface that indicate that the audio playback should be from a different audio playback application from the audio playback application from which the audio playback has begun (blocks 140, 150, and 240), the operating system may provide a playback queue of recommended content and display the recommended content from the playback queue on the user interface.

The content may be, for example, a song, an album, an artist, an episode of a podcast, etc. The operating system of the portable computing device may determine the content to be played and build a playback queue of content (e.g., a song queue, a playlist, etc.). When an audio playback application plays back content, the audio playback application transmits a dictionary that includes a key and values that identifies and describes the content being played to the operating system. The operating system dynamically updates the dictionary during playback. The key is a high level metadata that identifies the content (e.g., the artist's name), and the values may specifically describe the content (e.g., the title of the song, the album, the duration of the song, etc.). The operating system may store the dictionary in a memory location in the portable computing device that is accessible to the other parts of the portable computing device. For example, other programs executing on the portable computing device (e.g., an audio playback application) may access the memory location to obtain the key and values and provides this information (e.g., title of the song currently playing and the artist) to be displayed on the user interface (e.g., touch screen) to the user. This audio playback application may also transmit to the operating system a content tree. The root of the content tree may be the collection or lists of artists, the collection of albums, the collection of songs, the collection of playlists, etc. If the root is the collection of playlists (e.g., "all playlists"), the next level in content tree includes a listing of all of the playlists (e.g., "on-the-go", "workout mix", "studying music", etc.). The next level in the content tree from a selected playlist (e.g., "workout mix") may include a list of all of the songs in this playlist.

In one embodiment, using the dictionary and the content tree from the audio playback applications, the operating system may include an analytical engine that compiles a history of the content being played back by the user as well as the frequency of playback of the content (e.g., a play count of a song, album, artist, podcast etc.). The history of the content may also compile a time or day that the user plays back a given content (e.g., workout songs in the morning). The analytical engine may use the history of the content being played back and the frequency of playback to determine the recommended content and to generate a playback queue of recommended content. The recommendation of content to be played or the playback queue of recommended content may also be displayed to the user via the user interface to allow the user to select a content to be played.

In another embodiment, the analytical engine may also use the contextual information to determine the recommended content and to generate a playback queue of recommended content. For example, the analytical engine may determine from the contextual information that the user is running, the user is at the gym, and the time of day indicates that it is in the morning. Using this contextual information, the analytical engine determines that the user's most frequently played song from his "workout mix" playlist is the recommended content. Further, the analytical engine may provide the "workout mix" playlist as the playback queue of recommended content.

Figure 3:
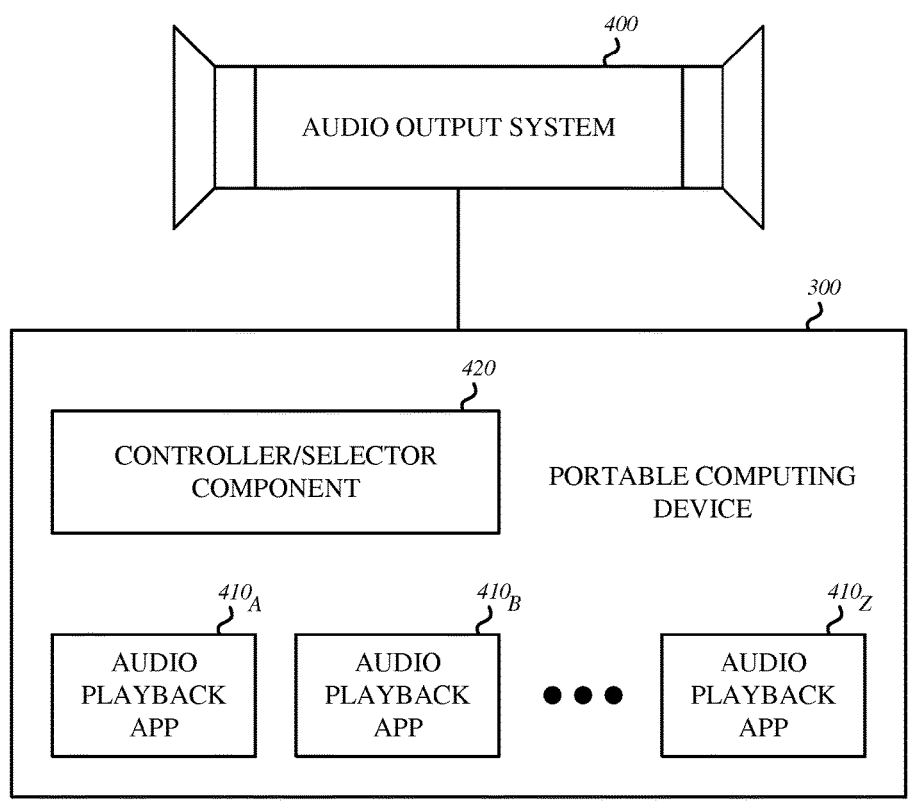
FIG. 3 is a block diagram illustrating a device, which may be a portable computing device, according to some embodiments.

FIG. 3 is a block diagram illustrating a device, which may be a portable computing device, according to some embodiments. Device 300 generally includes computer-readable medium 302, a processing system 304, an Input/Output (I/O) subsystem 306, wireless circuitry 308, and audio circuitry 310 including speaker 350 and microphone 352. These components may be coupled by one or more communication buses or signal lines 303. Device 300 can be any portable electronic device, including a handheld computer, a tablet computer, a mobile phone, laptop computer, tablet device, media player, personal digital assistant (PDA), a key fob, a car key, an access card, a multi-function device, a portable gaming device, or the like, including a combination of two or more of these items.

It should be apparent that the architecture shown in FIG. 3 is only one example of an architecture for device 300, and that device 300 can have more or fewer components than shown, or a different configuration of components. The various components shown in FIG. 3 can be implemented in hardware, software, or a combination of both hardware and software, including one or more signal processing and/or application specific integrated circuits.

Wireless circuitry 308 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 308 can use various protocols, e.g., as described herein.

Wireless circuitry 308 is coupled to processing system 304 via peripherals interface 316. Interface 316 can include conventional components for establishing and maintaining communication between peripherals and processing system 304. Voice and data information received by wireless circuitry 308 (e.g., in speech recognition or voice command applications) is sent to one or more processors 318 via peripherals interface 316. One or more processors 318 are configurable to process various data formats for one or more application programs 334 stored on medium 302.

Peripherals interface 316 couple the input and output peripherals of the device to processor 318 and computer-readable medium 302. One or more processors 318 communicate with computer-readable medium 302 via a controller 320. Computer-readable medium 302 can be any device or medium that can store code and/or data for use by one or more processors 318. Medium 302 can include a memory hierarchy, including cache, main memory and secondary memory.

Device 300 also includes a power system 342 for powering the various hardware components. Power system 342 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 300 includes a camera 344. In some embodiments, device 300 includes sensors 346. Sensors can include accelerometers, compass, gyrometer, pressure sensors, audio sensors, light sensors, barometers, and the like. Sensors 346 can be used to sense location aspects, such as auditory or light signatures of a location.

In some embodiments, device 300 can include a GPS receiver, sometimes referred to as a GPS unit 348. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 318 run various software components stored in medium 302 to perform various functions for device 300. In some embodiments, the software components include an operating system 322, a communication module (or set of instructions) 324, a location module (or set of instructions) 326, an audio playback application selection module 328, and other applications (or set of instructions) 334, such as a car locator app and a navigation app.

Operating system 322 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 324 facilitates communication with other devices over one or more external ports 336 or via wireless circuitry 308 and includes various software components for handling data received from wireless circuitry 308 and/or external port 336. External port 336 (e.g., USB, FireWire, Lightning connector, 60-pin connector, etc.) is adapted for coupling directly to other devices or indirectly over a network (e.g., the Internet, wireless LAN, etc.).

Location/motion module 326 can assist in determining the current position (e.g., coordinates or other geographic location identifier) and motion of device 300. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 326 receives data from GPS unit 348 and analyzes the signals to determine the current position of the mobile device. In some embodiments, location/motion module 72326 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 308 and is passed to location/motion module 326. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 300 based on the position coordinates of the corresponding transmitters. Regardless of the specific location technology used, location/motion module 326 receives information from which a location fix can be derived, interprets that information, and returns location information, such as geographic coordinates, latitude/longitude, or other location fix data.

An audio playback application selection module 328 can perform any of the operations or processes discussed above for one or more of the embodiments, to intelligently signal the start of audio playback when the device 300 connects to an audio output system (not shown).

The one or more applications 334 on the mobile device can include any applications installed on the device 300, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 306 can be coupled to a display system (not shown), which can be a touch-sensitive (i.e., touchscreen) display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 306 can include a display and user input devices such as a keyboard, mouse, and/or track pad. In some embodiments, I/O subsystem 306 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 302) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 300 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor, where the software code may be in any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

An embodiment may be an article of manufacture in which a machine-readable storage medium has stored thereon instructions that program one or more data processing components (generically referred to here as a "processor") to perform the operations described above. Examples of machine-readable storage mediums include read-only memory, random-access memory, CD-ROMs, DVDs, magnetic tape, optical data storage devices, and carrier waves. The machine-readable storage medium can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

Figure 4:
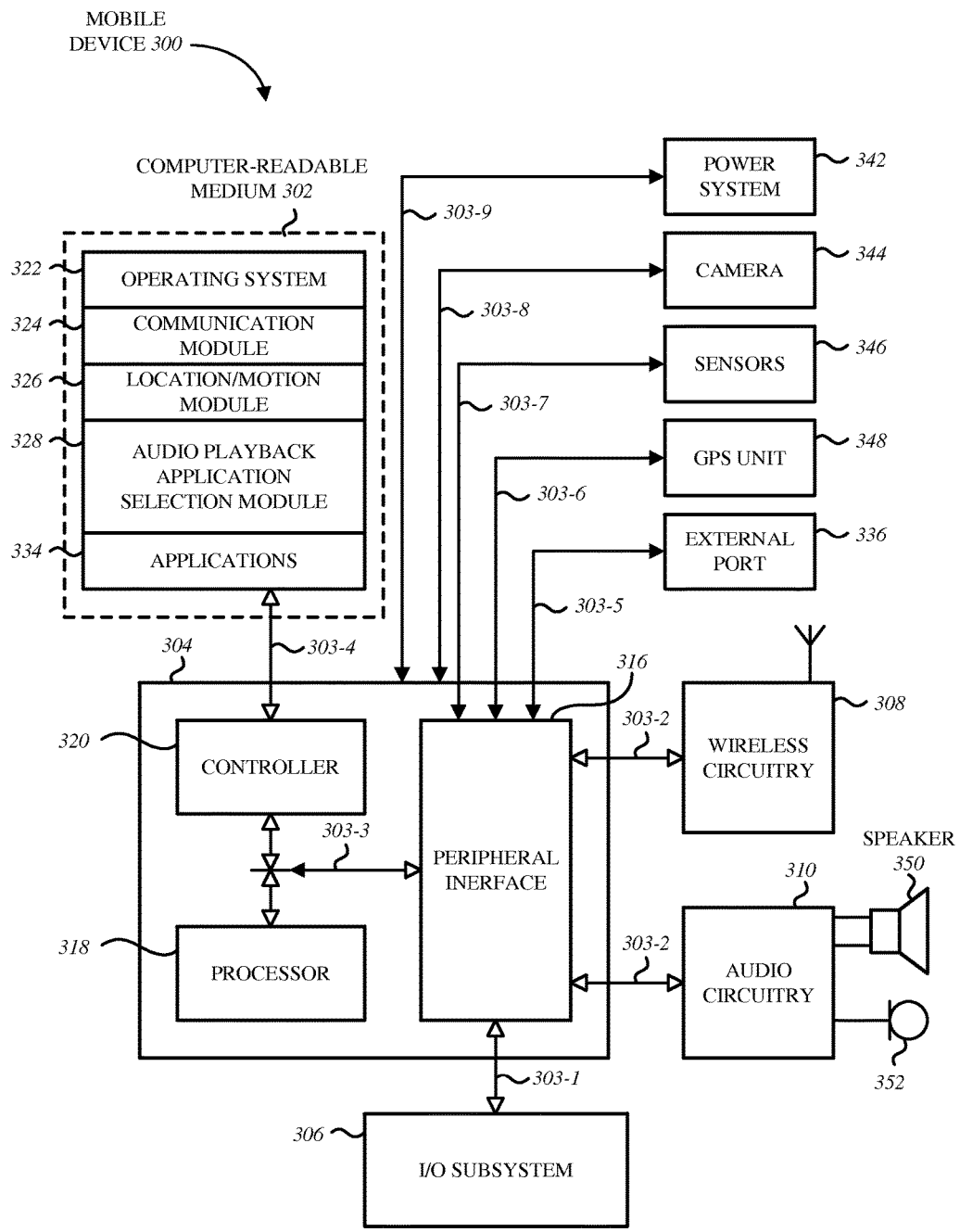
FIG. 4 illustrates the available audio playbacks to a connection that is made with an audio output system, in the portable computing device, according to some embodiments.

FIG. 4 illustrates the available audio playbacks to a connection that is made with an audio output system, in the portable computing device, according to some embodiments. As shown, the portable computing device 300 is connected to an audio output system 400 (e.g., over a wired connection or a wireless connection). The portable computing device 300 stores multiple audio playback applications 410A-Z. A controller/selector component 420 in the portable computing device 300 may implement the operations and processes described above for one or more embodiments to intelligently choose which audio playback application (e.g., amongst audio playback applications 410A-Z) to invoke when the portable computing device 300 connects to the audio output system 400. Once a decision has been made, the portable computing device 300 signals the audio output system 400 to begin playback from the chosen audio playback application 410 through the connection made with the audio output system 400.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

The invention claimed is:
1. A method by a portable computing device for intelligently signaling audio playback, comprising:
    detecting that a connection is made with an audio output system;

determining a first audio playback application that last played audio and when the first audio playback application last played audio;
determining whether the first audio playback application played audio within a specified amount of time in the past;
in response to determining that the first audio playback application played audio within the specified amount of time in the past, signaling audio playback from the first audio playback application to the audio output system, through the connection made with the audio output system; and
in response to determining that the first audio playback application did not play audio within the specified amount of time in the past, determining a second audio playback application that last played audio when the portable computing device was previously connected to the audio output system, and signaling audio playback from the second audio playback application to the audio output system, through the connection made with the audio output system.

2. The method of claim 1, wherein the audio output system is a vehicle head unit.

3. The method of claim 1, further comprising:
determining a recommended content to be played back using the first audio playback application based on an analysis of at least one of: a history of content played, a playback count of the content played, or contextual information, and
generating a playback queue including the recommended content.

4. The method of claim 1, further comprising:
providing a user interface for a user to indicate a change in audio playback, from the second audio playback application to the first audio playback application, while signaling audio playback from the second audio playback application.

5. The method of claim 1, further comprising:
providing a user interface for a user to indicate a change in audio playback, from the first audio playback application to the second audio playback application, while signaling audio playback from the first audio playback application.

6. The method of claim 5, further comprising:
determining a recommended content to be played back using the second audio playback application based on an analysis of at least one of: a history of content played, a playback count of the content played, or contextual information, and
generating a playback queue including the recommended content.

7. A portable computing device comprising:
a processor; and
memory in which are stored instructions that when executed by the processor, detect when a connection is made with an audio output system, and then determine a first audio playback application that last played audio and when the first audio playback application last played audio, and determine whether the first audio playback application played audio within a specified amount of time in the past,
and wherein in response to determining that the first audio playback application did not play audio within the specified amount of time in the past, the processor is to determine a second audio playback application that last played audio when the portable computing device was previously connected to the audio output system, that is prior to said connection, and signal audio playback to be performed from the second audio playback application, rather than from the first audio playback application, to the audio output system, through said connection.

8. The portable computing device in claim 7, further comprising:
a user interface to receive a user input indicating a change in audio playback.

9. The portable computing device in claim 8, wherein the user interface provides an optional playback application, the optional playback application identified based on contextual information and historical interactions of the user with the portable computing device.

10. The portable computing device in claim 9, wherein the contextual information includes at least one of: information about a current audio output system that the portable computing device is connected with, information about a current location of the portable computing device, or information about a current time of day.

* * * * *